(12) United States Patent
Pullen et al.

(10) Patent No.: US 6,798,097 B2
(45) Date of Patent: Sep. 28, 2004

(54) STATOR COOLING (75) Inventors: Keith Robert Pullen, London (GB); Justin Arthur Hall, Kingdom-upon-Thames (GB)

(73) Assignee: The Turbo Genset Company Limited, Middlesex (GB)

( * ) Notice: Subject to any disclaimer, the term of this patent is extended or adjusted under 35 U.S.C. 154(b) by 168 days.

(21) Appl. No.: 10/198,537

(22) Filed: Jul. 18, 2002

(65) Prior Publication Data

US 2003/0015925 A1 Jan. 23, 2003

(30) Foreign Application Priority Data

Jul. 18, 2001 (GB) ................................................ 0117556

(51) Int. Cl.[7] .......................... H02K 1/20; H02K 3/24; H02K 3/37; H02K 9/00
(52) U.S. Cl. ......................... 310/65; 310/60 A; 310/59
(58) Field of Search ......................... 310/58–59, 60 R, 310/60 A, 64–65, 180, 208; 29/598, 599, 605

(56) References Cited

U.S. PATENT DOCUMENTS

| | | | | |
|---|---|---|---|---|
| 3,439,202 A | * | 4/1969 | Wanke | 310/52 |
| 4,001,617 A | * | 1/1977 | Boyer | 310/52 |
| 4,190,780 A | * | 2/1980 | Whiteley | 310/59 |
| 6,104,111 A | * | 8/2000 | Pullen et al. | 310/59 |
| 6,304,011 B1 | * | 10/2001 | Pullen et al. | 310/52 |

FOREIGN PATENT DOCUMENTS

| | | | |
|---|---|---|---|
| EP | 0887911 | * 12/1998 | 310/58 |
| GB | 1556446 | 11/1979 | |
| GB | 2278504 A | 11/1994 | |
| GB | 2289576 A | 11/1995 | |
| GB | 2358968 A | 8/2001 | |

* cited by examiner

Primary Examiner—Tran Nguyen
(74) Attorney, Agent, or Firm—Gottlieb, Rackman & Reisman, P.C.

(57) ABSTRACT

The present invention relates to an electrical machine and more particularly to an arrangement of cooling passages within the stators of such machines. Cooling fluid is caused to pass through a number of channels provided in a space between winding discs to provide improved cooling of the winding discs.

32 Claims, 9 Drawing Sheets

STATOR COOLING

FIELD OF THE INVENTION

The present invention relates to the cooling of high speed axial flux electrical machines.

BACKGROUND OF THE INVENTION

Cooling of both the rotor and the stator in high speed axial flux machines is an important factor when considering the design of such machines. One cooling scheme adopted for cooling the rotor of such high speed axial flux electrical machines (for example as described in PCT/GB96/01292) consists of two or more discs in which the electrical coils are situated. These discs are separated by spacers consisting of thin radial wedges or spots etc. Air is pumped from the rotor rim towards the stator bore and drawn into the stator at its inner periphery via the rotor-stator air gap. The air is usually then drawn through the stator into a circumferential chamber and away by means of a fan. This kind of cooling circuit can be described as a series circuit since all the cooling air passing through the rotor-stator air gap also passes through the stator even though the cooling air for each stage of the generator is arranged in parallel.

There are a number of drawbacks with this arrangement which reduce the overall efficiency of the machine whether acting as a motor or a generator. In current designs, all the airflow must pass through the inner periphery of the stator. The gaps between the discs of the stator are preferably quite small, but this causes a severe restriction in the flow path of the cooling air. Consequently, a high pressure difference is needed in order to pass the required quantity of cooling air through the system.

This problem is made worse by the action of the rotors on the cooling air. As the air passes by the rotors between the rotor and stator, the air is accelerated in a tangential direction. This tangential air velocity sets up a vortex which causes a significant pressure differential between the outer periphery of the rotor and the stator inner periphery. In order to overcome these large pressure differentials, the fan driving the cooling air through the cooling circuit must have a high pressure ratio and consequently requires a large power input in order to drive it. This power either increases the power required to drive the electrical machine when acting as a generator or reduces the useful power available when the machine is working as a motor. In both cases the efficiency of the machine reduced.

Another problem with the series cooling circuit described above is that all the cooling air which enters the inside of the stator passes by the high speed rotor. This results in significant heating caused by the losses due to windage. This heating means the air is already hot when it enters the stator and consequently less heat is removed from the active parts of the stator. This means that because less heat can be removed from the stator, less electrical power can be drawn from or supplied to the electrical machine.

One possible solution to the problem of insufficient heat extraction from the stator is to increase the airflow through the gaps between the rotor and the stator. However this simply increases the windage losses, generating more heat in the air and requiring more power to drive the increased airflow. Consequently the machine is less efficient due to the increased power needed to provide the increased airflow.

SUMMARY OF THE INVENTION

Therefore, according to the present invention there is provided a stator winding unit for an electrical machine comprising: a plurality of disc shaped windings, at least one pair of said windings being axially spaced apart and having a spacer provided therebetween, the spacer comprising a plurality of walls between the windings defining a plurality of separate first channels for conducting cooling fluid, wherein each first channel is arranged for conducting cooling fluid between a first port at the outer periphery of the stator winding unit and a second port provided in at least one of said pair of windings.

The present invention further provides a stator winding unit for an electrical machine comprising: a plurality of disc shaped windings, at least one pair of said windings being axially spaced apart and having a spacer provided therebetween, the spacer comprising a plurality of walls between the windings defining a plurality of separate first channels for conducting cooling fluid, wherein each first channel is arranged for conducting cooling fluid between a first port at the outer periphery of the stator winding and a radial second port provided at the outer periphery of the stator winding unit.

The present invention provides a number of advantages over the series cooling circuit of the prior art. An electrical machine in accordance with the present invention allows the quantity of air passing through the gap between the rotor and the stator to be substantially less than the amount of air passing through the inside of the stator. This provides a number of advantages over the series cooling circuit of the prior art. As the amount of air required to pass between the stator and the rotor is reduced, the pressure difference required to pump that air is also reduced and consequently less power is needed to pump the air. This helps to improve the overall efficiency of the machine. Not all the cooling air passing into the stator has been preheated by passing between the stator and rotor and so the overall temperature of the air entering the stator is lower and thus the air is able to remove more heat from the stator. This means that more power can be supplied to or drawn from the stator for a given maximum temperature limit of the stator. Since more heat is removed by a given amount of air, less air is required overall and furthermore less air is required to pass through the gap between the rotor and the stator, and so the losses will be further reduced. This leads to an overall increase in the efficiency of the machine by reducing both heating due to windage losses and the power consumption of the fan since the total cooling air mass flow required is reduced.

BRIEF DESCRIPTION OF THE DRAWINGS

The present invention will now be described in detail by reference to specific examples and with reference to the figures in which.

DETAILED DESCRIPTION OF A PREFERRED EMBODIMENT

Figure 19:
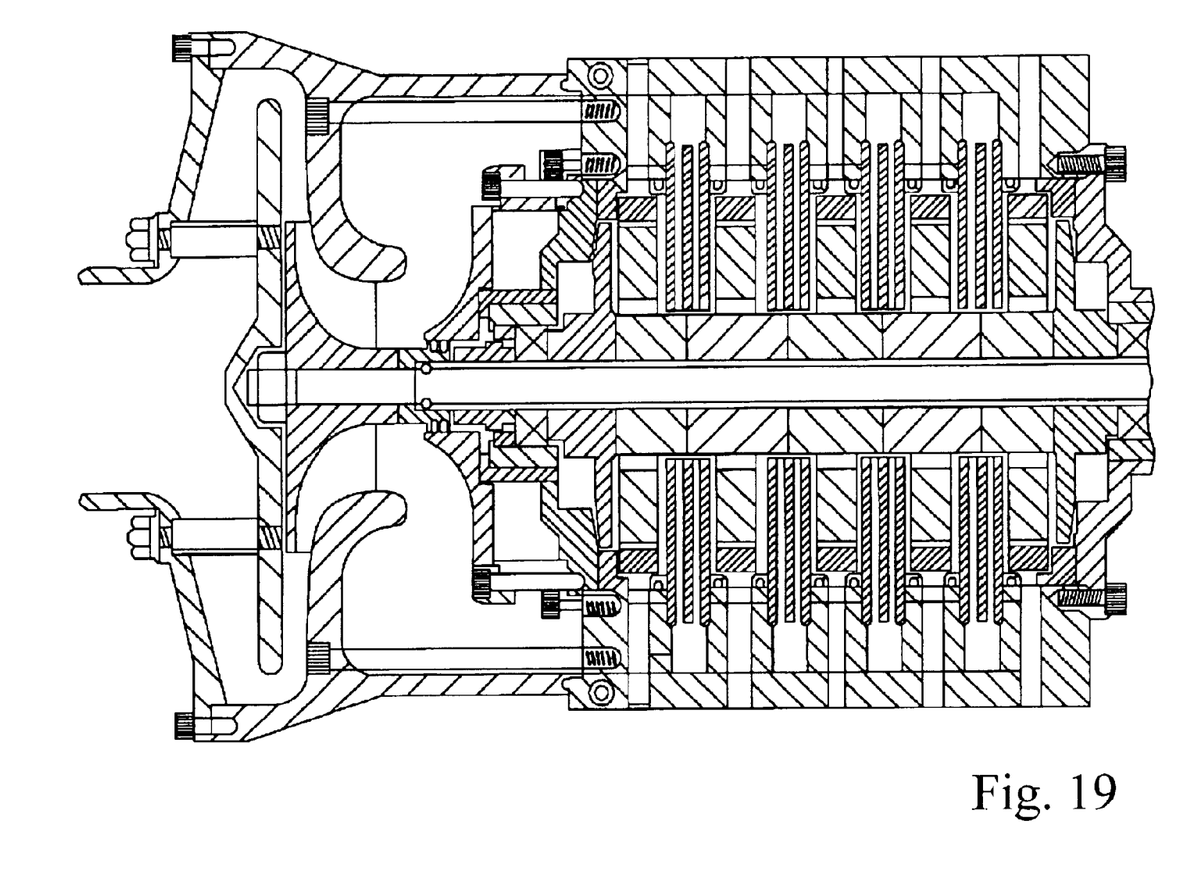
FIG. 19 shows a schematic representation of a cross-section through a motor to which the present invention is applied.

FIG. 19 shows a representation of a typical axial flux electrical machine in which a plurality of generally disc-shaped stators are interleaved between a number of generally disc-shaped rotor sections. The general construction of this kind of motor is well-known and will not be described in detail here. The rotors comprise a plurality of magnets whilst the stators are provided with one or more disc-shaped windings.

Figure 1:
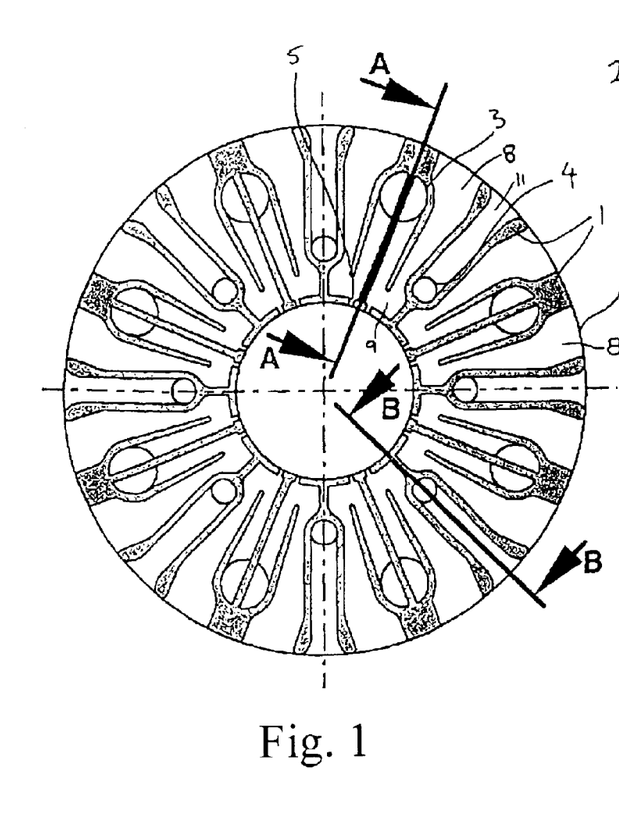
FIG. 1 is a sectional view in the axial plane of the inside of a stator according to a first embodiment of the present invention.
Figures 2, 3, 4:
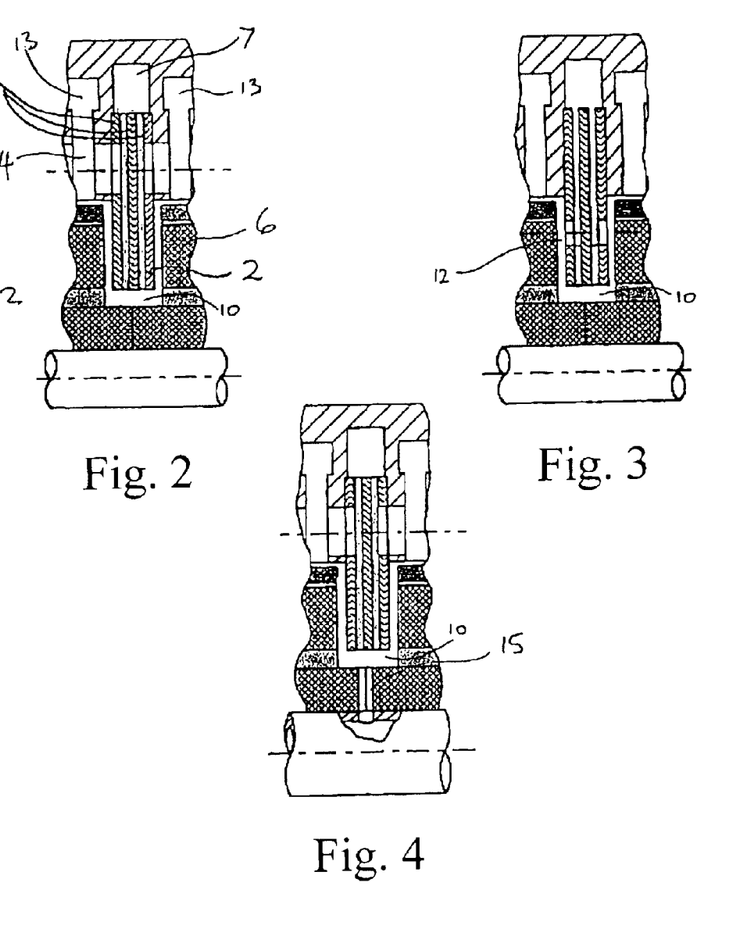
FIG. 2 is a sectional view along A—A of FIG. 1.
FIG. 3 is a sectional view along B—B of FIG. 1.
FIG. 4 is a sectional view along A—A of FIG. 1 with an alternative rotor configuration.

The generally arrangement of the stators and rotors in the construction of the present invention can be seen in FIG. 2. In FIG. 2, between the two rotors 6, there is a gap in which the stator is located. Each of the stators comprises a plurality of stator coil discs 2 between which are provided spacers which define passages through which the cooling fluid can pass. FIG. 1 shows an exemplary layout for the spacers 1 in accordance with the first embodiment of the present invention.

The spacers 1 are generally formed from sheet material typically laser cut, water cut or machined. Alternatively they can be cast in a non conducting material such as a polymer. The spacers are bonded to the stator discs containing the stator coils 2 to form a composite stator structure. The spacers are laid out between the stator coil discs to define therein a series of passages between inlets and outlets on the stator. In the construction of FIG. 1, the passages formed by the spacers are arranged to communicate between arrays of holes formed in the stator. For example, in the construction of FIG. 1, axial holes 3 and 4 are formed in the stator coil discs with the hole 3 preferably being formed between the coil whilst the holes 4 are preferably formed at the centre of the coils. Additional holes 5 are formed at the inner periphery of the stator which form further passages for coiling fluid to pass into the space between the rotor and the stator. However, these holes are not essential to the present invention. Although the holes 3 and the holes 4 are shown in the figures as being circular, this is also not essential and any shape of hole suitable for allowing cooling fluid to pass therethrough may be used.

The operation of the embodiment shown in FIGS. 1–3 will now be described. Throughout the rest of the description, the cooling fluid will be referred to as being air although other gases or liquids may be used for cooling the motor. The passage of cooling air through the stator can be in either direction. In a first mode, the pressure in the chambers 7 is set to be greater than the pressure in chambers 13. Air from the chambers 7 enters the passages inside the stator at regions 8 and passes to regions 9. The majority of the air then passes out through the holes 3 before flowing to the regions 14. Some of this air may pass through the passages 5 into region 10 between the rotor and the stator. The remainder of the air from the chambers 7 which does not pass into region 8 and through holes 3 and 5, enters the inside of the stator at regions 11 and out through hole 4 to regions 12 (shown in FIG. 3). The flow from the holes 4 mixes with the air from the holes 5 at regions 12. The combined flow then mixes with the flow from holes 3 at regions 14 before going into the chambers 13.

In a second mode of operation, the system is rearranged to reverse the overall air flow by means of making the air pressure in the chambers 13 greater than the pressure in chambers 7 causing a flow of air to pass in the opposite direction, i.e. from the chambers 13 to the chambers 7. The air from the chambers 13 passes to regions 14 and divides such that a proportion of the air goes to the regions at 12 and the remainder passes through the holes 3 and into the inside of the stator. The majority of air which passes into regions 12 passes into the stator via the holes 4. The remainder travels toward the inner periphery of the stator and into the stator via the holes 5. In each of the above modes of operation, the stator may be arranged so that air passes through the holes 5 in the opposite directions to that described above. For example, in the second mode, air may pass out of holes 5 from the stator into regions 10 and mix with the air passing from regions 14 to regions 12. Thus the air going through holes 4 would consist of the addition of the two flows. The direction and flow of the air passing through holes 5 is dependent upon the detailed design of the passages formed by spacer 1 and the sizes of the holes 3, 4 and 5.

A modification of the invention is shown in FIG. 4 in which additional cooling air is provided via passages 15 which allow air to pass from a cavity in the rotor shaft to the regions 10. Such a method for providing additional cooling air may be used in conjunction with any of the described cooling schemes of this invention. Air may also be withdrawn into the cavity in the shaft according to the relative pressures set up in the system.

Figure 5:
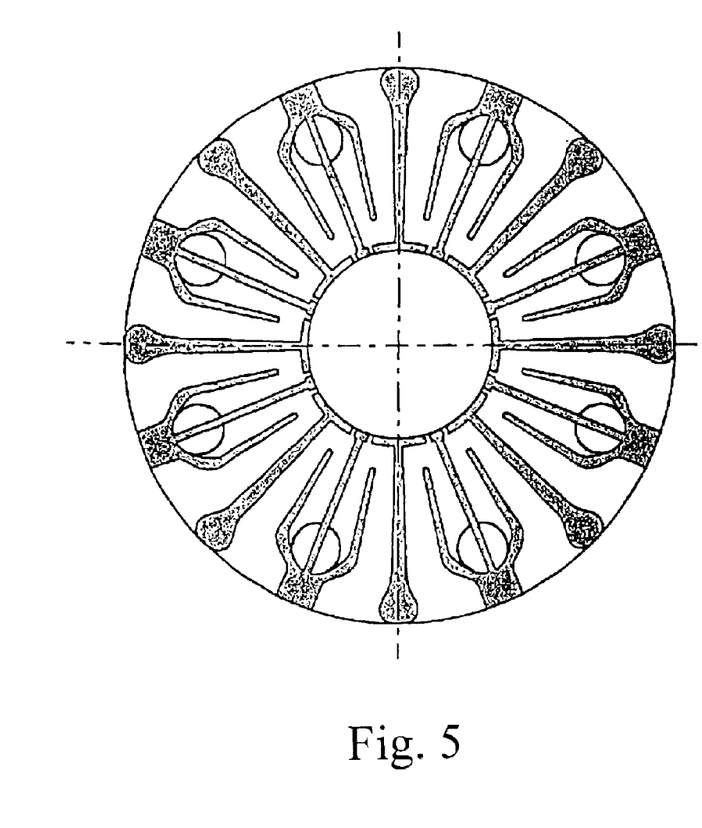
FIG. 5 is a sectional view in the axial plane of the inside of a stator according to a second embodiment of the present invention.

FIG. 5 shows a second embodiment in which a different design of spacer 1 is employed. Here, the holes 4, shown in FIGS. 1, 2 and 3 have been removed. In the first embodiment these holes provide cooling air for the rotor and the outer surface of the stator. However, in some constructions they may be dispensed with. This may be the case if the cooling air flow passing through the holes 5 is sufficient to allow satisfactory cooling in the case of the arrangement shown in FIGS. 1, 2 and 3 or where sufficient additional cooling is afforded by the passages 15 as shown in FIG. 4. In either case the rotor and outer surface of the stator is cooled by the flow through the holes 5 and/or 15.

Figure 6:
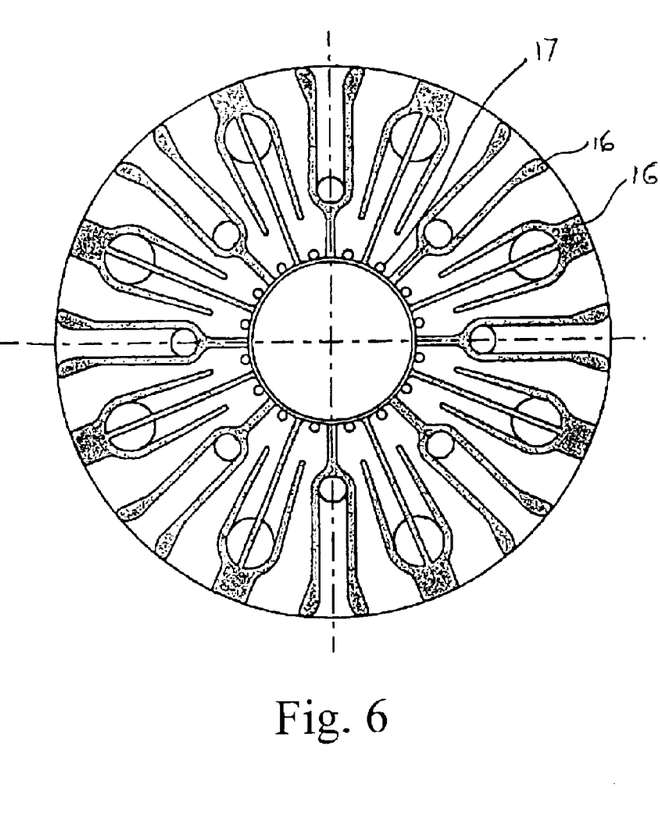
FIG. 6 is a modified version of the stator of FIG. 1.

FIG. 6 shows a modified version of the construction of FIGS. 1–3, having an alternative configuration for the holes 5. Here, the spacers 16 are extended inwards such that they have an inner diameter which is less than that of the stator coil discs 2. The spacers then protrude from the inner side of the stator. In this way rather than the air flowing radially into the space between the rotor and the stator through the holes 5, the air flow flows sideways i.e. axially out of the protruding portions of the spacers. In addition, the stator discs 2 themselves can also be extended inwards to a smaller diameter either during their own manufacturing process or by means of the addition of rings of an electrically non-conducting material. Once the stator discs and spacers are assembled, the assembly can be drilled with holes 17 which will have a function which is similar to holes 5 but with the air flow passing out of the stator axially rather than radially. This alternative means of forming the holes in the stator inner periphery may be implemented in any one of the variants of the invention described.

Figures 7, 8:
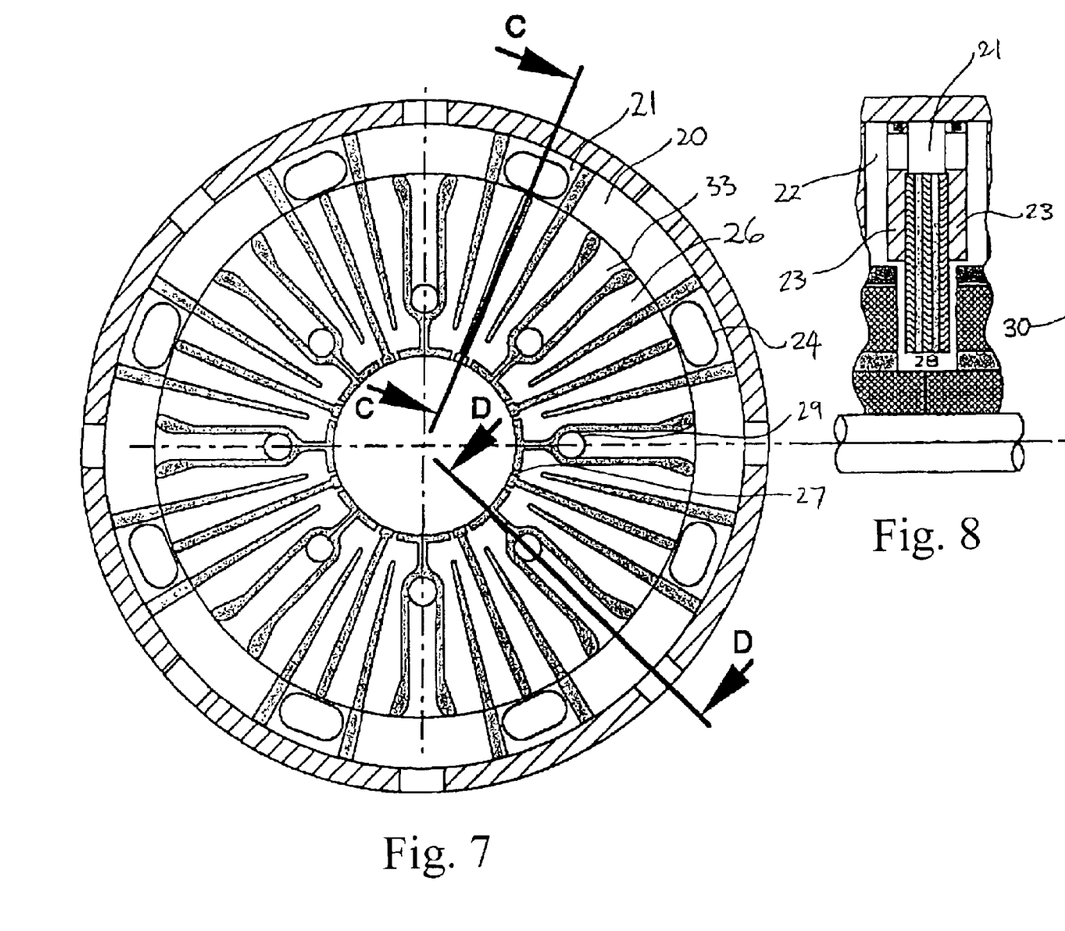
FIG. 7 is a sectional view in the axial plane of the inside of a stator according to a third embodiment of the present invention.
FIG. 8 is a sectional view along C—C of FIG. 7.
Figure 9:
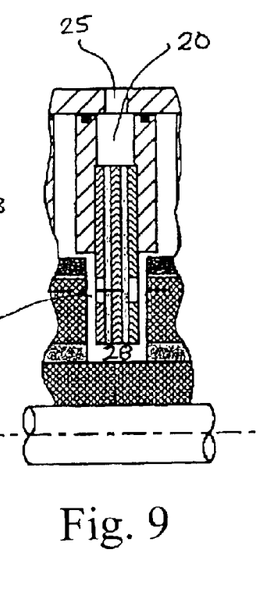
FIG. 9 is a sectional view along D—D of FIG. 7.
Figure 10:
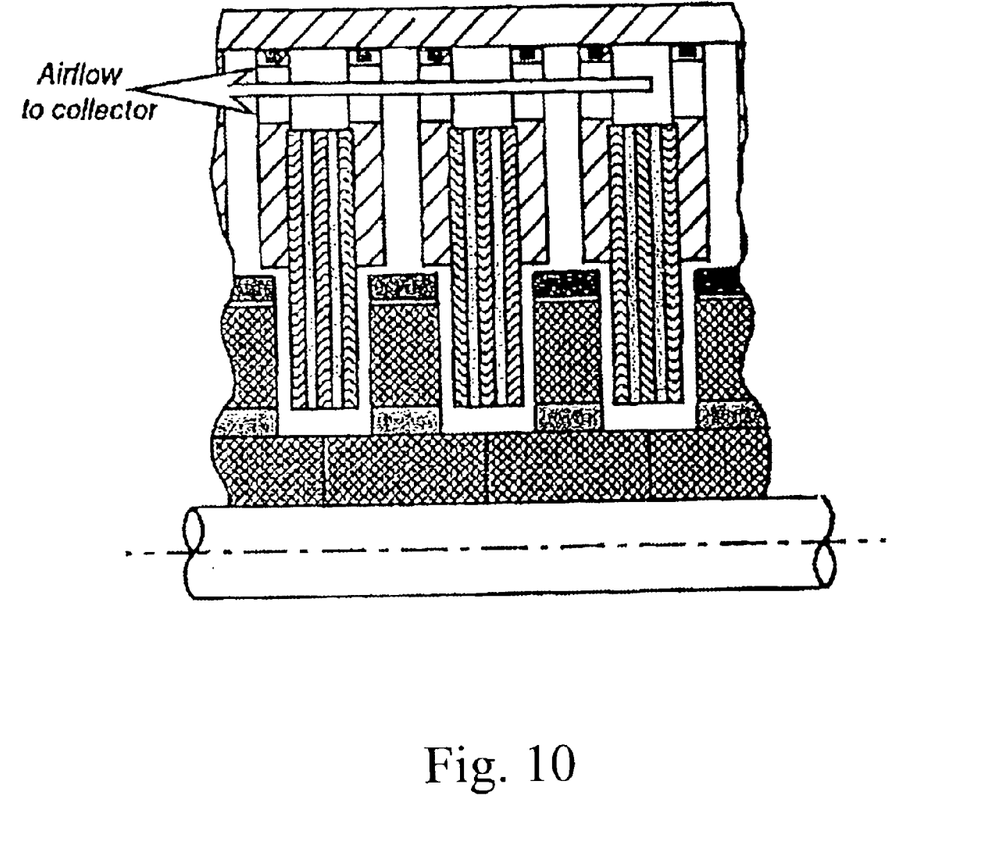
FIG. 10 is a sectional view along C—C of FIG. 7 showing a plurality of stators similar to those shown in FIG. 8.

The view of the third embodiment in FIG. 7 shows a typical sectional view of the inside of a stator in the axial plane. FIG. 8 shows a typical sectional view in one radial plane. FIG. 9 shows a typical sectional view in another radial plane. The positions of the sections for FIGS. 8 and 9 are indicated on FIG. 7 as C—C and D—D respectively. In one variant of this cooling system, the pressure is greater in chambers 20 than in chambers 21 and chambers 22. The stator coil discs are sandwiched between two discs 23 into which holes 24 are made allowing communication between chambers 21 and chambers 22. The holes 24 may be of any shape but it is advantageous to make the size of the holes as large as possible to minimise air flow resistance. Air enters chambers 20 through holes 25. A proportion of this air passes into the stator at regions 26 and a sub proportion of this air passes through the holes 27 to the region 28. The remainder of the air not passing through holes 27 passes to the chambers 21. The proportion of air not passing into the regions 26 passes into the stator at regions 28 and then out through holes 29. The air passes through the holes 27 radially outwards into the space between the rotor and the stator before mixing with the air passing through the holes 29 at regions 30. This combined flow then passes directly to the chambers 22 and mixes with the air flowing through the holes 24. The arrangement is such that the airflow from other stator stages in the machine may also flow through the holes 21 and mix with the air coming from this stator stage. This is shown in FIG. 10 for three stages of a multistage machine. The cooling arrangement is applicable to a machine of any number of stages as well as a single stage. The air which leaves the holes 21 of the last stage in the machine is then expelled from the machine.

Figure 11:
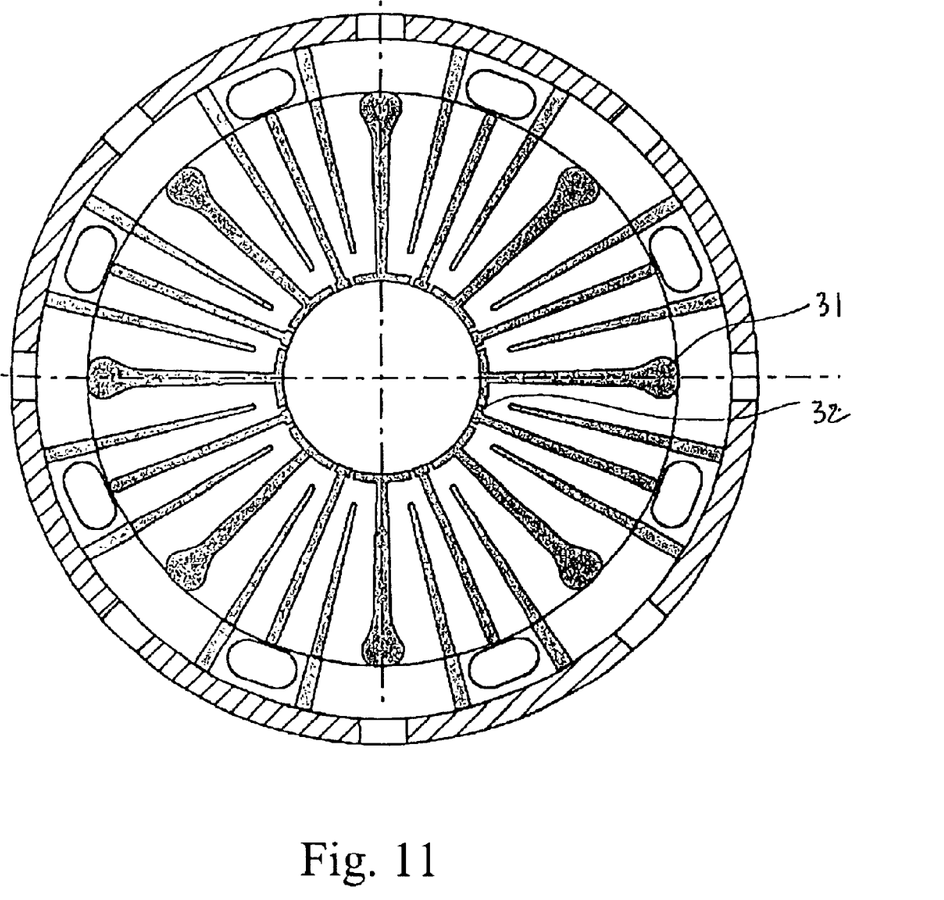
FIG. 11 is a sectional view in the axial plane of the inside of a stator according to the fourth embodiment of the present invention.
Figure 12:
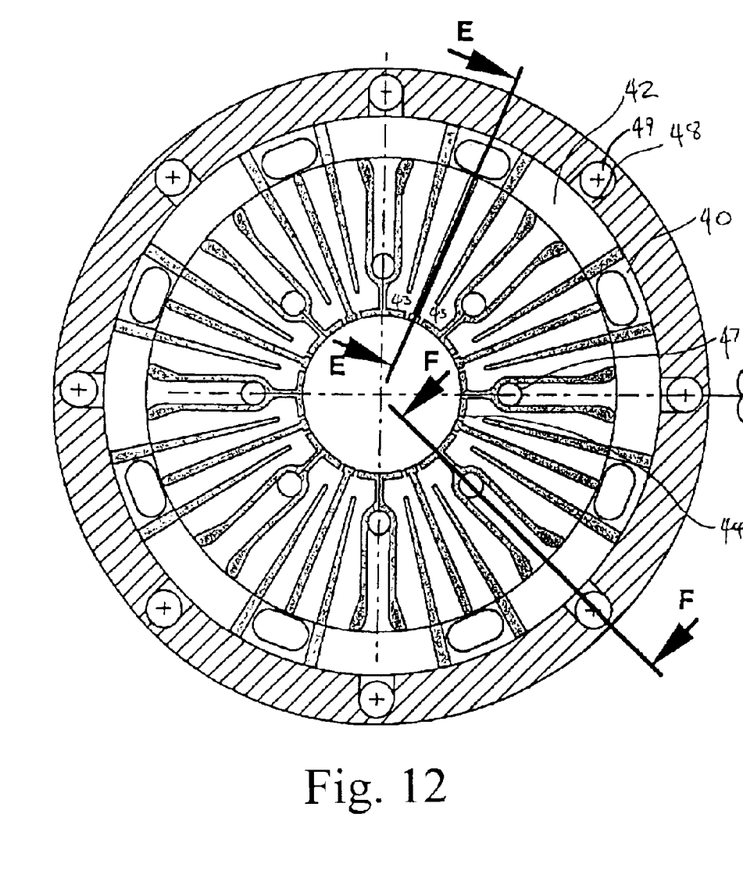
FIG. 12 is a sectional view in the axial plane of the inside of a stator according to a fifth embodiment of the present invention.
Figure 13:
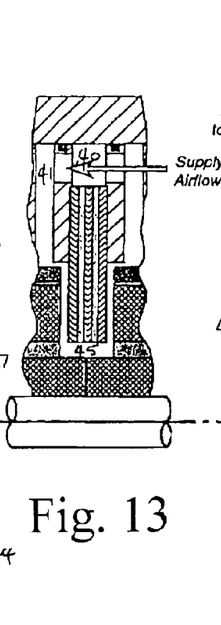
FIG. 13 is a sectional view along E—E of FIG. 12.
Figure 14:
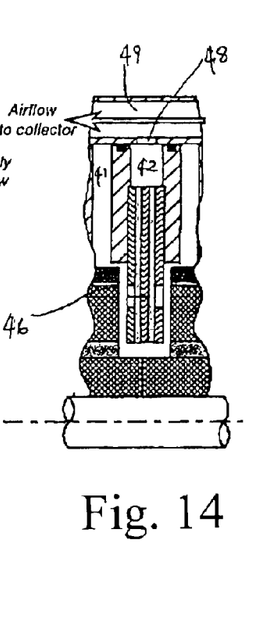
FIG. 14 is a sectional view along F—F of FIG. 12.

A fourth embodiment, which is a variant of the third embodiment is shown in FIG. 11. Here, the holes 29 shown in FIG. 7 have been removed and the shape of the spacers 31 are changed accordingly. Such an arrangement would be suitable if the flow from holes 32 is sufficient to provide the air flow between the stator and rotor. This variant is a similar modification to that made to the first embodiment to arrive at the second embodiment. A further variant of the arrangement of the third embodiment shown in FIG. 7 is shown in FIG. 12, with sectional views in FIGS. 13 and 14, as a fifth embodiment. Here the direction of the air flows is reversed relative to the scheme shown in FIG. 7. Air is supplied to chambers 40 and 41 at a pressure greater than the pressure in chambers 42. Air from chambers 40 passes to regions 43 and the flow divides with a proportion flowing to chambers 42 and the remainder of the air passes through the holes 44 to region 45. Another flow of air passes from the chambers 41 to the regions 46 before entering the holes 47. The air passing through the holes 47 then flows to chambers 42.

Air is collected from chambers 42 via holes 49 into passages 48 and expelled from the machine.

Figure 15:
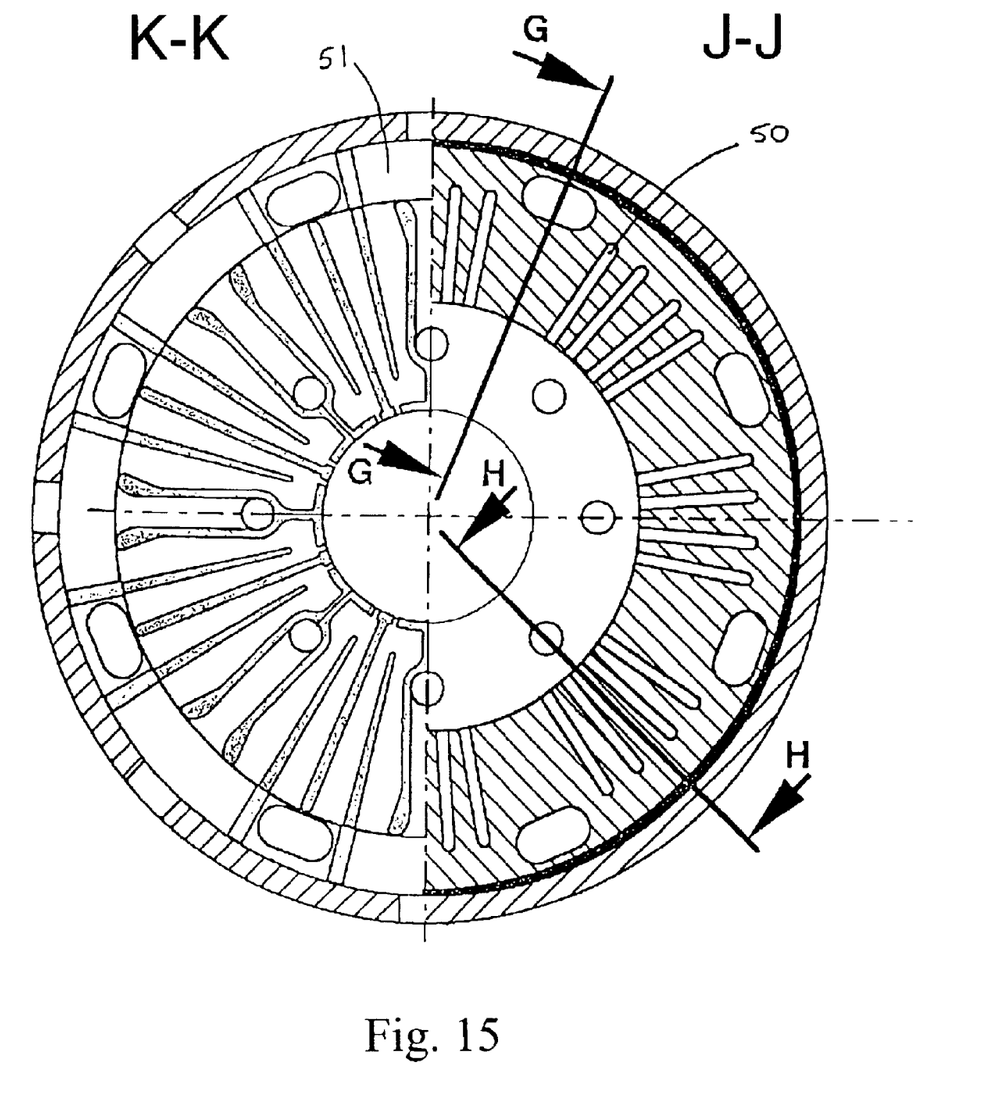
FIG. 15 is two offset half sectional views in an axial plane of the inside of a stator according to a modification of the present invention.
Figure 16:
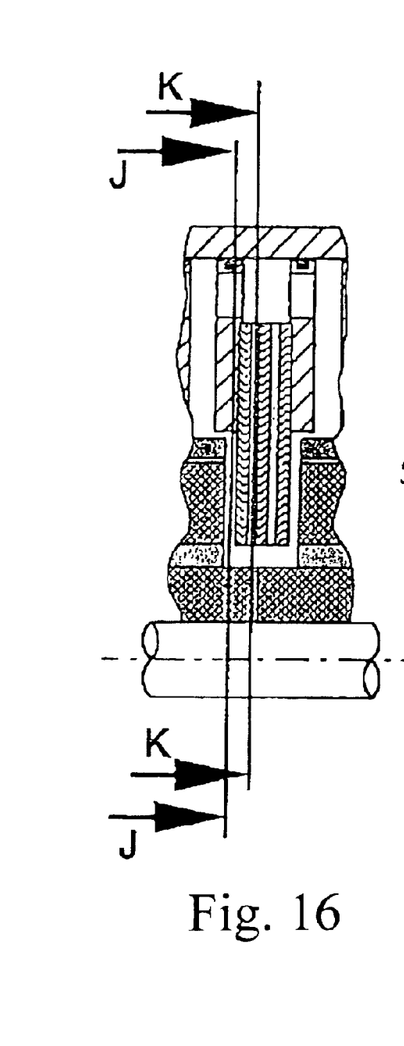
FIG. 16 is a sectional view along G—G of FIG. 15.
Figure 17:
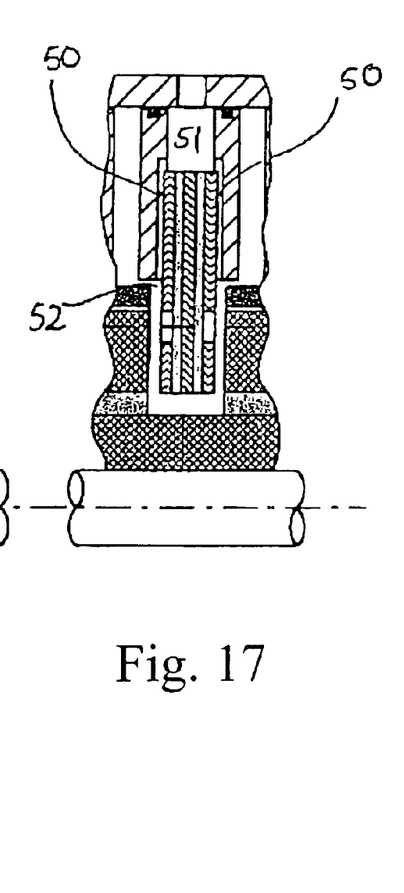
FIG. 17 is a sectional view along H—H of FIG. 15.
Figure 18:
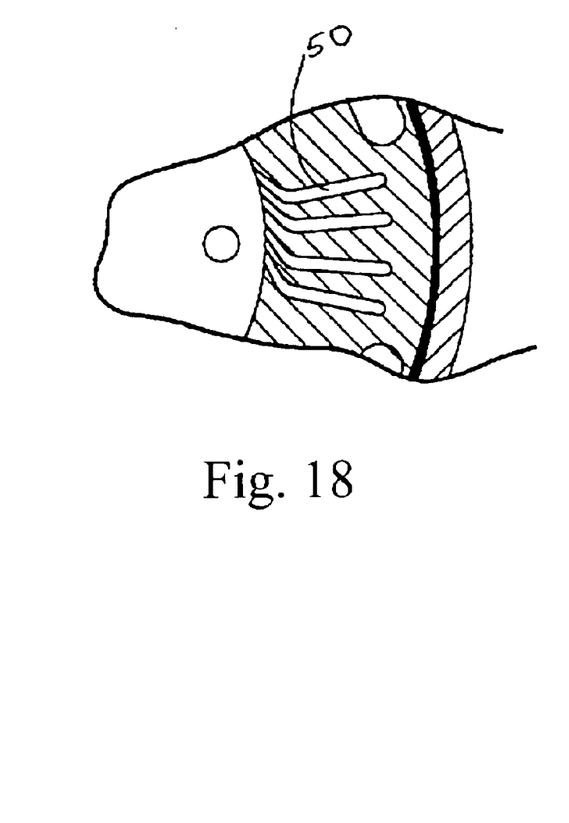
FIG. 18 shows a partial view of the construction shown in FIG. 15 showing an alternative arrangements of the slots.

An enhancement of the parallel cooling method is shown in FIGS. 15, 16 and 17. Here, additional passages 50 are formed which allow additional cooling air to be directed onto the rotor periphery by allowing air to flow from regions 51 to regions 52 when the pressure in regions 51 is greater than that in regions 52. Alternatively, heated air may be removed via passages 50 if the pressure in regions 51 is less than that in regions 52. Such a feature may be used in conjunction with any of the cooling scheme variants described. Although the passages 50 are essentially radial slots, such passages may be varied in shape in order to afford pre-swirling of the air such as shown in FIG. 18 when air is flowing from regions 51 to 52. Alternatively, the passage shape may be as shown in FIG. 18 in order to draw away heated air which has a tangential component of velocity when the airflow in question is from regions 52 to regions 51. In both cases, the need to suddenly change the direction of the air from radial to tangential, or vice versa, is avoided. This helps to reduce losses in the machine and ultimately improve the overall efficiency.

What is claimed is:

1. A stator winding unit for an electrical machine comprising:
    a plurality of disc shaped windings, at least one pair of said windings being axially spaced apart and having a spacer provided therebetween, the spacer comprising a plurality of walls between the windings defining a plurality of separate first channels for conducting cooling fluid, wherein
        each first channel is arranged for conducting cooling fluid between a first port at the outer periphery of the stator winding unit and a second port provided in at least one of said pair of windings.

2. A stator winding unit according to claim 1, wherein the first port and the second port are provided at opposite ends of each first channel.

3. A stator winding unit according to claim 1, wherein each first channel further comprises a third port provided at the radially inner periphery of the stator winding unit.

4. A stator winding unit according to claim 3, wherein the third port is arranged so that cooling fluid passes radially therethrough.

5. A stator winding unit according to claim 3, wherein the third port is provided in at least one of said pair of windings such that cooling fluid passes axially therethorough.

6. A stator winding unit according to claim 3, wherein the third port is arranged to communicate with a part of the first channel between the first and second ports.

7. A stator winding unit according to claim 1, wherein each first channel is generally u-shaped when viewed in the plane of the stator winding unit.

8. A stator winding unit according to claim 1, further comprising a plurality of separate second channels, each second channel arranged for conducting cooling fluid between a fourth port at the outer periphery of the stator winding unit and a fifth port provided in at least one of said pair of windings for axially communicating cooling fluid therethrough.

9. A stator winding unit according to claim 8, wherein each second channel is provided between an associated pair of first channels.

10. A stator winding unit according to claim 8, wherein when the stator winding unit is positioned in an electrical machine, the stator winding unit is interleaved between disc-shaped rotors and the fifth port is provided in said windings at a position which faces one of said rotors.

11. A stator winding unit according to claim 8, wherein the first port of one or more of said first channels and the fourth port of one or more of said second channels are connected to a stator chamber provided at the outer circumference of the windings.

12. A stator winding unit according to claim 11, further comprising one or more channels connecting the stator chamber to a region on the axially outer surface of the stator winding unit where, in use, the gap between the rotor and stator winding unit ends, at the radially outer periphery of the rotor.

13. A stator winding unit according to claim 1, wherein the first port of one or more of said first channels is connected to a stator chamber provided at the outer circumference of the windings.

14. A stator winding unit according to claim 13, further comprising one or more channels connecting the stator chamber to a region on the axially outer surface of the stator winding unit where, in use, the gap between the rotor and stator winding unit ends, at the radially outer periphery of the rotor.

15. A stator winding unit for an electrical machine comprising:
a plurality of disc shaped windings, at least one pair of said windings being axially spaced apart and having a spacer provided therebetween, the spacer comprising a plurality of walls between the windings defining a plurality of separate first channels for conducting cooling fluid, wherein
each first channel is arranged for conducting cooling fluid between a first port at the outer periphery of the stator winding and a radial second port provided at the outer periphery of the stator winding unit.

16. A stator winding unit according to claim 15, wherein the first port and the second port are provided at opposite ends of each first channel.

17. A stator winding unit according to claim 15, wherein each first channel further comprises a third port provided at the radially inner periphery of the stator winding unit.

18. A stator winding unit according to claim 17, wherein the third port is arranged so that cooling fluid passes radially therethrough.

19. A stator winding unit according to claim 17, wherein the third port is provided in at least one of said pair of windings such that cooling fluid passes axially therethorough.

20. A stator winding unit according to claim 17, wherein the third port is arranged to communicate with a part of the first channel between the first and second ports.

21. A stator winding unit according to claim 15, wherein each first channel is generally u-shaped when viewed in the plane of the stator winding unit.

22. A stator winding unit according to claim 15, further comprising a plurality of separate second channels, each second channel arranged for conducting cooling fluid between a fourth port at the outer periphery of the stator winding unit and a fifth port provided in at least one of said pair of windings for axially communicating cooling fluid therethrough.

23. A stator winding unit according to claim 22, wherein each second channel is provided between an associated pair of first channels.

24. A stator winding unit according to claim 22, wherein when the stator winding unit is positioned in an electrical machine, the stator winding unit is interleaved between disc-shaped rotors and the fifth port is provided in said windings at a position which faces one of said rotors.

25. A stator winding unit according to claim 22, wherein the first port of one or more of said first channels and the fourth port of one or more of said second channels are connected to a stator chamber provided at the outer circumference of the windings.

26. A stator winding unit according to claim 25, further comprising one or more channels connecting the stator chamber to a region on the axially outer surface of the stator winding unit where, in use, the gap between the rotor and stator winding unit ends, at the radially outer periphery of the rotor.

27. A stator winding unit according to claim 15, wherein the first port of one or more of said first channels is connected to a stator chamber provided at the outer circumference of the windings.

28. A stator winding unit according to claim 27, further comprising one or more channels connecting the stator chamber to a region on the axially outer surface of the stator winding unit where, in use, the gap between the rotor and stator winding unit ends, at the radially outer periphery of the rotor.

29. An axial flux electrical machine comprising:
a stator winding unit according claim 1; and
a rotor unit comprising a rotor shaft and one or more rotor disc units mounted thereon.

30. An electrical machine according to claim 29, further comprising one or more rotor chambers, each arranged generally radially outward of the rotor units and axially offset from the stator winding unit, the rotor chamber being arranged for communicating cooling fluid with the second port.

31. An axial flux electrical machine comprising:
a stator winding unit according claim 15; and
a rotor unit comprising a rotor shaft and one or more rotor disc units mounted thereon.

32. An electrical machine according to claim 31, further comprising one or more rotor chambers, each arranged generally radially outward of the rotor units and axially offset from the stator winding unit, the rotor chamber being arranged for communicating cooling fluid with the second port.

* * * * *